(12) United States Patent
Kim et al.

(10) Patent No.: US 8,812,427 B2
(45) Date of Patent: Aug. 19, 2014

(54) SYSTEM AND METHOD FOR DISAGGREGATING POWER LOAD

(75) Inventors: Hyungsul Kim, Urbana, IL (US); Manish Marwah, Santa Clara, CA (US); Martin Arlitt, Calgary (CA); Geoff Lyon, El Granada, CA (US); Martha Lyons, Sunnyvale, CA (US); Chandrakant Patel, Fremont, CA (US); Cullen Bash, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 307 days.

(21) Appl. No.: 13/095,518

(22) Filed: Apr. 27, 2011

(65) Prior Publication Data

US 2012/0278272 A1 Nov. 1, 2012

(51) Int. Cl.
*G06F 9/44* (2006.01)
*G06N 7/02* (2006.01)
*G06N 7/06* (2006.01)

(52) U.S. Cl.
USPC .......................................................... 706/52

(58) Field of Classification Search
None
See application file for complete search history.

(56) References Cited

U.S. PATENT DOCUMENTS

| | | | |
|---|---|---|---|
| 6,937,946 B1 * | 8/2005 | Culp et al. ....................... | 702/62 |
| 2010/0280978 A1 | 11/2010 | Shimada et al. | |
| 2010/0305889 A1 | 12/2010 | Tomlinson, Jr. et al. | |

FOREIGN PATENT DOCUMENTS

WO WO 2011002735 1/2011

OTHER PUBLICATIONS

Applying IT to Solve Societal Grand Challenges: Residential Energy Monitoring Services as the First Pillar Geoff Lyon, Manish Marwah, Charles Hickman, Martha Lyons, Chandrakant Patel, Tom Christian, Sue Charles Venkata Dandamudi.*
Non-intrusive appliance load monitoring system based on a modern kWh-meter Hannu Pihala VTT Energy This licentiate thesis has been submitted for official examination for the degree of Licentiate in Technology in Espoo, May 1998.*
Applying IT to Solve Societal Grand Challenges: Residential Energy Monitoring Services as the First Pillar Geoff Lyon, Manish Marwah, Charles Hickman, Martha Lyons, Chandrakant Patel, Tom Christian, Sue Charles Venkata Dandamudi Published in: SRII Global Conference (SRII), 2011 Annual Date of Conference: Mar. 29 2011-Apr. 2 2011.*
Deokwoo Jung, Andreas Savvides, Estimating Building Consumption Breakdowns Using On/off State Sensing and Incremental Submeter Deployment, Publication Date: 2010; On pp. 225-238; http://portal.acm.org/citation.cfm?id=1870006.
Marisa B. Figueiredo; Ana De Almeida; Bernadete Ribeiro; Antonio Martins; Extracting Features from an Electrical Signal of a Non-intrusive Load Monitoring System, Publication Date: 2010; vol. 6283; On p. 210217, http://www.springerlink.com/content/21712867q848g43q/.

* cited by examiner

*Primary Examiner* — Kakali Chaki
*Assistant Examiner* — Ababacar Seck

(57) ABSTRACT

Systems and methods of disaggregating power load are provided. An example of a method is carried out by program code stored on non-transient computer-readable medium and executed by a processor. The method includes receiving time series data representing total energy consumption. The method also includes identifying distinguishing features in the time series data. The method also includes identifying energy consumption constituents of the total energy consumption based on the features.

20 Claims, 12 Drawing Sheets

SYSTEM AND METHOD FOR DISAGGREGATING POWER LOAD

BACKGROUND

Concern over increasing energy costs and climate change are motivating residential power conservation efforts. These concerns have motivated efforts to reduce the emissions of $CO_2$ and other greenhouse gases (GHGs). Energy consumption in the residential sector is a significant contributor of GHGs. For example, the residential sector is responsible for over one third of all electricity use in the United States. While information is available on the typical use of electricity in homes (e.g., heating, cooling, water heating, and lighting account for about 50% of all residential electricity use), this aggregate information does not enable homeowners to readily reduce their energy consumption.

Two typical approaches to conserving energy are efficiency and curtailment. Efficiency involves one-time actions (e.g., upgrading to more energy-efficient appliances), and carry a higher cost. Curtailment involves continuous participation (e.g., using less energy on a regular basis). But energy consumption is an abstract concept to most consumers. In addition, consumers are often mistaken about how energy is used in the home, and thus which actions would be most beneficial for conserving energy.

DETAILED DESCRIPTION

Figure 1:
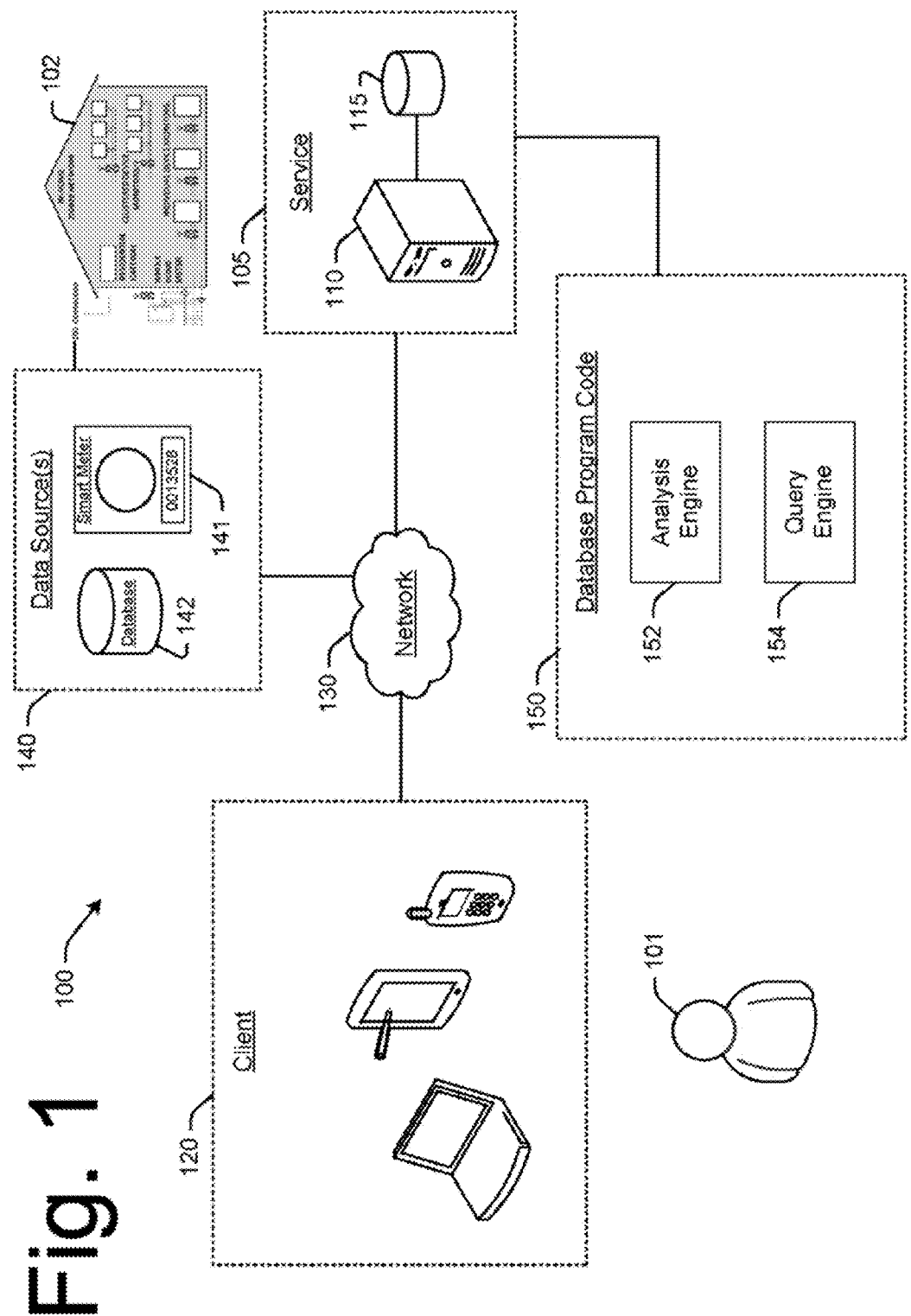
FIG. 1 is a high-level block-diagram of an example computer system that may implement disaggregating power load.

Studies have identified a solution to energy consumption issues as personalized, frequent, continuous, credible, clear and concise feedback. This feedback shows the consumer how energy is used in the home, which can help modify consumer behavior and result in lower energy consumption. Indeed, some studies have shown that with proper feedback, residential energy consumption can be reduced by at least 9%-20% and as much as 50% or more in some cases. Enhanced feedback can also help curtail peak consumption by as much as 50% or more.

Providing frequent feedback to home owners has not always been cost effective and therefore has not been widely adopted. However, recent advances in computer hardware technology enable more frequent feedback. In particular, as old power meters are being replaced with so-called "smart" meters, more information can be made available to consumers.

Unfortunately, even smart meters do not provide an appliance-specific breakdown of energy use in a cost-effective manner. Without this breakdown, residential energy conservation efforts are unlikely to achieve widespread success. The systems and methods disclosed herein provide consumers with this information by disaggregating power load.

Current smart meters typically only provide sample data of no more than once per second. The techniques described herein may be utilized even where only low frequency measurements are available, making disaggregating power load more widely applicable.

Current smart meters also are installed on a wide variety of houses and other buildings, which do not necessarily have the same energy consuming devices. The techniques described herein may be used in such an environment using unsupervised techniques. Unsupervised techniques are those that can be used on data that is not labeled (i.e., energy consumption labeled for individual components). The unsupervised techniques do not require manual/laborious and intrusive data labeling. In addition, the techniques described herein, may be used with empirical data collected from a plurality of homes over a predetermined duration (e.g., six months). Briefly, disaggregating power load systems and methods are disclosed herein which utilize variants of the factorial hidden Markov model. Results indicate that a conditional factorial hidden semi-Markov model, which integrates additional features related to when and how appliances are used in the home, provides an accurate, per-appliance breakdown of power consumption. Results confirm that unsupervised techniques may be used to provide per-appliance power usage information in a non-invasive manner for enabling power conservation efforts.

In an example, aggregate power consumption (Y) is provided by the smart meter for a total time (T). Aggregate power consumption may be disaggregated into power consumption (y) for each time increment (1, 2, ... T) and expressed as $Y=(y_1, y_2, \ldots, y_T)$. Power load for each a number of appliances (M) can be inferred by:

$$Q^{(1)} = \langle q_1^{(1)}, q_2^{(1)} \ldots q_T^{(1)} \rangle$$
$$Q^{(2)} = \langle q_1^{(2)}, q_2^{(2)} \ldots q_T^{(2)} \rangle$$
$$\vdots$$
$$Q^{(M)} = \langle q_1^{(M)}, q_2^{(M)} \ldots q_T^{(M)} \rangle$$

such that:

$$y_t = \sum_{i=1}^{M} q_t^{(i)}$$

where:

$q_t^{(i)}$ is the power load by the individual appliance (i) at time (t).

Energy disaggregation can be determined based on extensions of a hidden Markov model (HMM). In an example, four HMM variants are used to model the data. Factorial HMM (FHMM) models the hidden states of all the appliances. Conditional FHMM (CFHMM) extends FHMM to incorporate additional features, such as time of day, other sensor measurements, and dependency between appliances. Another variant, factorial hidden semi-Markov model (FHSMM) extends FHMM to fit the probability distributions for the state occupancy durations of the appliances. Another variant composes FHSMM and CFHMM, so that the additional features can be considered together with the more accurate probability distributions for the state occupancy durations of the appliances. This variant is referred to herein as a conditional factorial hidden semi-Markov model (CFHSMM).

The systems and methods described herein provide for disaggregating power load and can be used to meet or exceed conservation efforts, reduce energy costs, and/or reduce environmental impact of energy consumption.

Before continuing, it is noted that as used herein, the term "includes" means includes but not limited to, and the term "including" means including but not limited to. The term "based on" means based at least in part on.

FIG. 1 is a high-level block-diagram of an example computer system 100 which may implement disaggregating power load. System 100 may be implemented with any of a wide variety of computing devices, such as, but not limited to, stand-alone desktop/laptop/netbook computers, workstations, server computers, blade servers, mobile devices, and appliances (e.g., devices dedicated to providing a service), to name only a few examples of devices which can provide output to a user 101. Each of the computing devices may include memory, storage, and a degree of data processing capability at least sufficient to manage a communications connection either directly with one another or indirectly (e.g., via a network). At least one of the computing devices is also configured with sufficient processing capability to execute the program code described herein.

In an example, the system 100 may include a host 110 providing a service 105 accessed by a user 101 via a client device 120. For purposes of illustration, the service 105 may be a data processing service executing on a host 110 configured as a server computer with computer-readable storage 115. The client 120 may be any suitable computer or computing device (e.g., a mobile device) capable of accessing the host 110. Host 110 and client 120 are not limited to any particular type of devices. It is also possible for the host 110 and client 120 to be the same device (e.g., a dedicated energy-consumption monitoring appliance installed in the home).

Although it is noted that the database operations described herein which may be executed by the host 110 are typically better performed on a separate computer system having more processing capability, such as a server computer or plurality of server computers. The user interface may be provided on any computing device for providing data to, and receiving data from, service 105.

The system 100 may also include a communication network 130, such as a local area network (LAN) and/or wide area network (WAN). In one example, the network 130 includes the Internet or other mobile communications network (e.g., a 3G or 4G mobile device network). Network 130 provides greater accessibility to the service 105 for use in distributed environments, for example, where more than one user may have input and/or receive output from the service 105.

In an example, the host 110 is implemented with (or as part of) the service 105 in the networked computer system 100. For example, the service 105 may be provided on-site, or may be part of a cloud-based service, wherein the host 110 is at least one server computer in a cloud computing system. The host 110 may be provided on the network 130 via a communication connection, such as via an Internet service provider (ISP). In this regard, the client 120 is able to access host 110 directly via the network 130, or via an agent, such as a network site. In an example, the agent may include a web portal on a third-party venue (e.g., a commercial Internet site), which facilitates a connection for one or more clients 120 with host 110. In another example, portal icons may be provided (e.g., on third-party venues, pre-installed on a computer or mobile device, etc.) to facilitate a communications connection between the host 110 and client 120.

In addition, the host 110 may be operable to communicate with at least one information source 140. The source 140 may include a smart meter 141 for providing time series energy consumption data (e.g., monitored or sampled for the house 102 or other building). The source 140 may also include other suitable source(s) 142 for information about various system components. For example, other information may include time-of-day correlations, temperature correlations, etc. which may be used to identify constituents of total energy consumption based on external factor(s).

The host 110 may execute analytics using the information from the source 140 to generate output for disaggregating power load for a system under consideration. For example, the host 110 receives information from the source 140 including total energy consumption for various energy-consuming constituents (e.g., appliances and other energy-consuming devices). The host 110 may maintain the results in at least one data structure (e.g., a matrix or table or database) in computer-readable media 115. The data structure may be accessed by the host 110, which performs analytics and outputs the results for the user.

In an example, the host 110 performs the analytics described herein by executing database program code 150. The database program code 150 may include an analysis engine 152 and a query engine 154. In an example, the analytics engine 152 may be integrated into the query engine 154. The analytics engine 152 may be an SQL-based analytics engine, and the query engine 154 may be an SQL query engine. However, the operations described herein are not limited to any specific implementation with any particular type of database.

A system that implements disaggregating power load as described herein has the capability to take time series data representing total energy consumption, and identify features in the time series data to identify energy consumption constituents of the total energy consumption. A list of energy consuming constituents and/or an assessment of various energy savings options may be output. Disaggregating power load may be better understood with reference to the following discussion of an example implementation of machine readable instructions.

Figure 2:
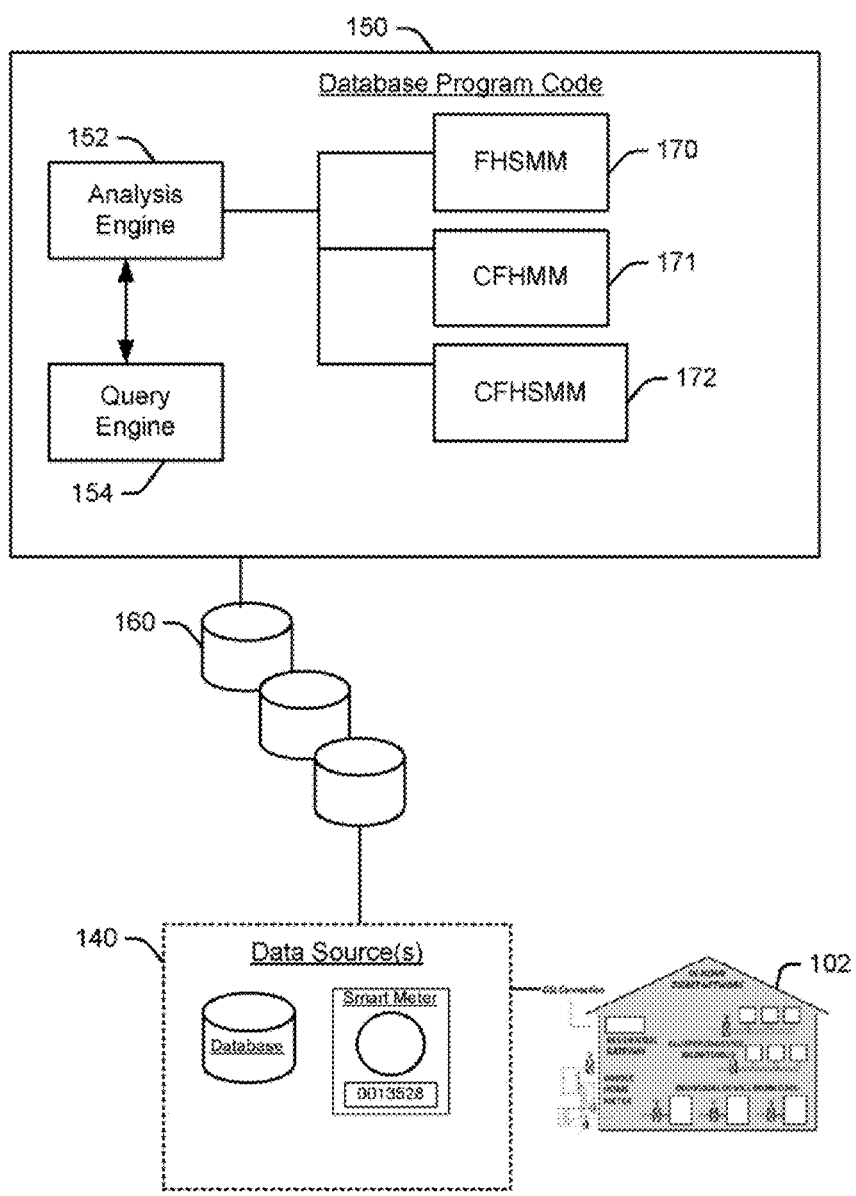
FIG. 2 shows an example architecture of machine readable instructions for program code which may disaggregate power load.

FIG. 2 shows an example architecture of machine readable instructions for the database program code 150 which may execute disaggregating power load program code. In an example, the database program code 150 may be implemented in machine-readable instructions (such as but not limited to, software or firmware) stored on a computer readable medium (e.g., storage 115 in FIG. 1) and executable by one or more processor (e.g., on host 110 in FIG. 1) to perform the operations described herein. The database program code 150 may perform operations on at least one database 160 (or other data structure) including information from data sources 140. The database 160 may be provided on the same or different computer readable medium (e.g., storage 115 in FIG. 1). It is noted, however, the components shown in FIGS. 1 and 2 are provided only for purposes of illustration of an example operating environment, and are not intended to limit execution to any particular computing system.

During operation, the analysis engine 152 may be operatively associated with the query engine 154 to execute the function of the architecture of machine readable instructions as self-contained modules. These modules can be integrated within a self-standing tool, or may be implemented as agents that run on top of an existing database.

In an example, the architecture of machine readable instructions may execute one or more probabilistic models 170-172. Example probabilistic models integrate stable-state features, and learning the parameters of these models is unsupervised, which is desirable for residential power disaggregation, as labeled data is not required, simplifying deployment.

The models 170-172 are generative. That is, a probabilistic model is defined that explains the generating process of the observed data. These models can contain hidden variables that are not observed. In one case, the states of appliances are the hidden variables, and the aggregate power load is the observation. The models have several parameters that can be learned from data. The learning process includes estimating the parameters from the observations such that the model can best describe the observations. Then, using the model with these parameters, the hidden variables are estimated, which are the states of the appliances. The following examples include three variants of FHMM.

1. Factorial Hidden Semi-Markov Model (FHSMM) 170. An inherent feature in FHMMs is that a state occupancy duration is constrained to be geometrically distributed. However, the ON-durations are modeled better with a gamma distribution. Modeling state occupancy durations in HMMs has been studied. The models are called Hidden Semi-Markov Model (HSMM) or Non-Stationary Hidden Markov Model (NSHMM). Instead, a Factorial Hidden Semi-Markov Model (FHSMM) is defined as the model obtained by combining the method of modeling state occupancy durations in HSMM with FHMM.

2. Conditional Factorial Hidden Markov Model (CFHMM) 171. FHMMs do not consider additional features such as time of day, day of week, or input from other sensors. To use these, a CFHMM is used, where the transition probabilities are not constant but are conditioned on the extra features. This model is similar to a coupled hidden Markov model (CHMM). However, CFHMMs have a more general form, as they consider the dependencies between hidden state sequences and the additional input sequences.

3. Conditional Factorial Hidden Semi-Markov Model (CF-HSMM) 172. The FHMM model is further extended to create the Conditional Factorial Hidden Semi-Markov Model (CF-HSMM). This new model has the advantages of both FHSMM and CFHMM. This extension allows the model to use a gamma distribution for ON-durations, to consider the dependencies between appliances and the dependencies on additional features.

Figure 9:
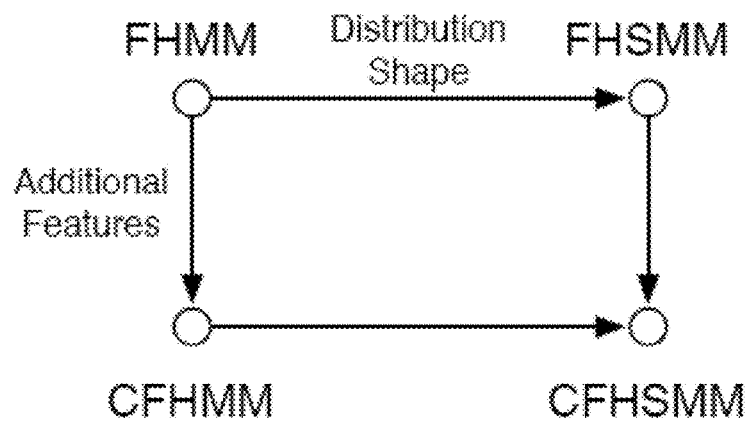
FIG. 9 shows relationships between various models.

The models 170-172 is now described in more detail below. FIG. 9 shows the relationship between these three models.

Hidden Markov Models (HMM) are probabilistic models used for modeling sequential data and are known to perform well, for example at tasks such as speech recognition. A discrete-time hidden Markov model can be viewed as a Markov model whose states are not directly observed. Instead, each state is characterized by a probability distribution function, modeling the observations corresponding to that state. More formally, an HMM is defined by the following entities:

$S=\{S_1, S_2, \ldots, S_N\}$ the finite set of hidden states:
the transition matrix $A=\{a_{ij}, 1 \leq i,j \leq N\}$ representing the probability of moving from state $S_i$ to state $S_j$, $$a_{ij}=P(q_{t+1}=S_j|q_t=S_i), 1 \leq i,j \leq N.$$

with $a_{ij} \geq 0$. $\Sigma_{j=1}^{N} a_{ij}=1$, and where $q_t$ denotes the state occupied by the model at time t.

the emission matrix $B=\{b(o|S_j)\}$, indicating the probability of emission of symbol $o \in V$ when system state is $S_j$:V can be a discrete or a continuos set, in which case $b(o|S_j)$ is a probability density function.
$\pi=\{\pi_i\}$, the initial state probability distribution.

$$\pi_i=P(q_1=S_i), 1 \leq i \leq N$$

with $\pi_i \geq 0$ and $\Sigma_{i=1}^{N} \pi_i=1$.

Suppose sequential data $y=\{y_1, y_2, \ldots y_t, \ldots y_T\}$. Every $y_t$ is generated by a hidden state $(q_t)$. The underlying states $q=\{q_1, q_2, \ldots q_t, \ldots q_T\}$ form a Markov chain. Given the current state, the next state is independent of the past (Markov property).

$$P(q_{t+1}|q_{t-1}, \ldots, q_1)=P(q_{t+1}|q_t)$$

As an extension of HMMs, factorial HMMs were introduced to model multiple independent hidden state sequences. In a FHMM, if $Y=(y_1, y_2, \ldots y_T)$ is the observed sequence, then $q=\{q^{(1)}, q^{(2)}, \ldots q^{(M)}\}$ represents the set of underlying state sequences, where $q^{(i)}=\{q_1^{(i)}, q_2^{(i)}, \ldots q_T^{(i)}\}$ is the hidden state sequence of the chain i. In general, factorial learning techniques (and associated algorithms) are used to discover multiple independent causes or factors underlying the data. FHMMs are used for modeling time series generated by the interaction of several independent processes because HMMs use exponentially many parameters to represent all the states.

There are two kinds of features for power disaggregation: (1) transient signatures, and (2) stable-state signatures. Transient signatures capture electrical events, such as high frequency noise in electrical current or voltage, generated as a result of an appliance turning on or off. Although these features are good candidates for use in disaggregation, sampling data fast enough to capture these features may require special instrumentation. For example, a custom built device may measure at rates up to 100 KHz. However, most smart meters being deployed today have much lower sampling rates, typically 1 Hz or less.

Stable-state signatures relate to more sustained changes in power characteristics when an appliance is turned on/off. These persist until the state of the appliance changes, which can be captured with low frequency sampling. But even for stable-state features the frequency of sampling is considered, because at low sampling rates the probability of multiple on/off events occurring between two measurements increases, making the disaggregation task more difficult. In addition to the real power measurement, AC power meters typically provide several other metrics, such as, reactive power, frequency, power factor, etc., each of which could potentially be used as additional features depending on the set of appliances to be disaggregated.

Accordingly, the systems and methods described herein are based on stable-state features because these features can be more readily obtained, for example, from smart meters, in which case no additional instrumentation is used in the buildings. An example feature for disaggregation is the real power measurement. However, other power features may help distinguish appliances from one another, so the systems and methods may also allow multiple other features to be integrated into the model. Examples of other features, unrelated to power metrics, include but are not limited to on/off duration, date/time, dependency between appliances, daily schedule of the occupants, etc.

The systems and methods may also implement unsupervised learning techniques (and associated algorithms) for disaggregating the appliances. In an example, detailed power measurements were collected from actual homes in the state of California, for a period of six months. Extensive instrumentation was installed in the home, collecting data at the individual appliance level. Data collection at the individual appliance level was done to enable proper validation of the disaggregation method. The data was then aggregated from multiple individual appliances to test the ability of the methods described herein to disaggregate this data. The original traces of power use for each instrumented appliance were analyzed to assess the performance of the disaggregation methods. By successfully disaggregating the aggregate power data, thorough (and expensive) instrumentation of homes is not necessary to obtain per-appliance measurements. This is a practical consideration, and the motivation for unsupervised techniques.

In the following sections, a single home was used to establish the datasets, and investigate the possible stable-state features by analyzing the data. Table 1 lists a subset of the appliances in the home that were monitored. The "Label" for each appliance is an abbreviation formed from its location and appliance type. For example, "fam_tv" is the television located in the Family Room, while "liv_tv" is the television located in the Living Room.

TABLE 1

Summary of household appliances

| Label | Location | Appliance | Power |
|---|---|---|---|
| fam_tv | Family Room | Television | 73 W |
| fam_ps3 | Family Room | Playstation 3 | 67 W |
| fam_stereo | Family Room | Home Theater | 41 W |
| kit_ref | Kitchen | Refrigerator | 82 W |
| liv_tv | Living Room | Television | 177 W |
| liv_xbox | Living Room | Xbox 360 | 111 W |
| off_laptop | Office | Laptop | 61 W |
| off_monitor | Office | Monitor | 38 W |

Figure 3:
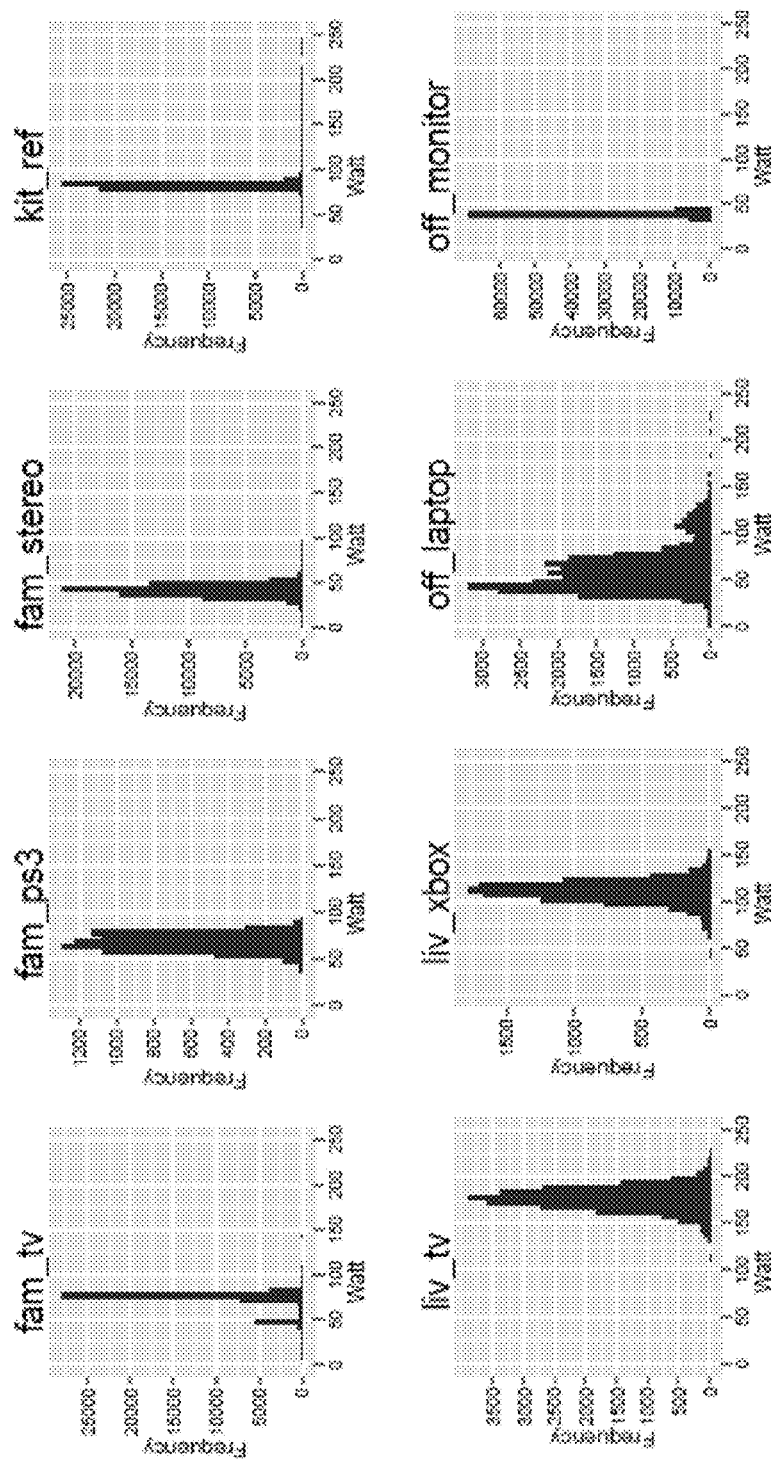
FIG. 3 are histograms of example appliance power consumption.

In this example, the real power consumption was the most significant feature. Table 1 shows the average real power consumption values for each of the appliances. Each appliance is assumed to have two states (on and off) and its power consumption follows the Gaussian distribution when the appliance is on. FIG. 3 shows that this assumption is valid for most of the home appliances, except the family room TV (fam_tv) and office laptop (off_laptop). The "fam_tv" has a standby-mode in which it consumes less power. The power consumption of "off_laptop" varies depending on whether its battery is being charged, and its power state. Even though some appliances have multiple states, these appliances can be considered to be composed of two or more two-state appliances.

Figure 4:
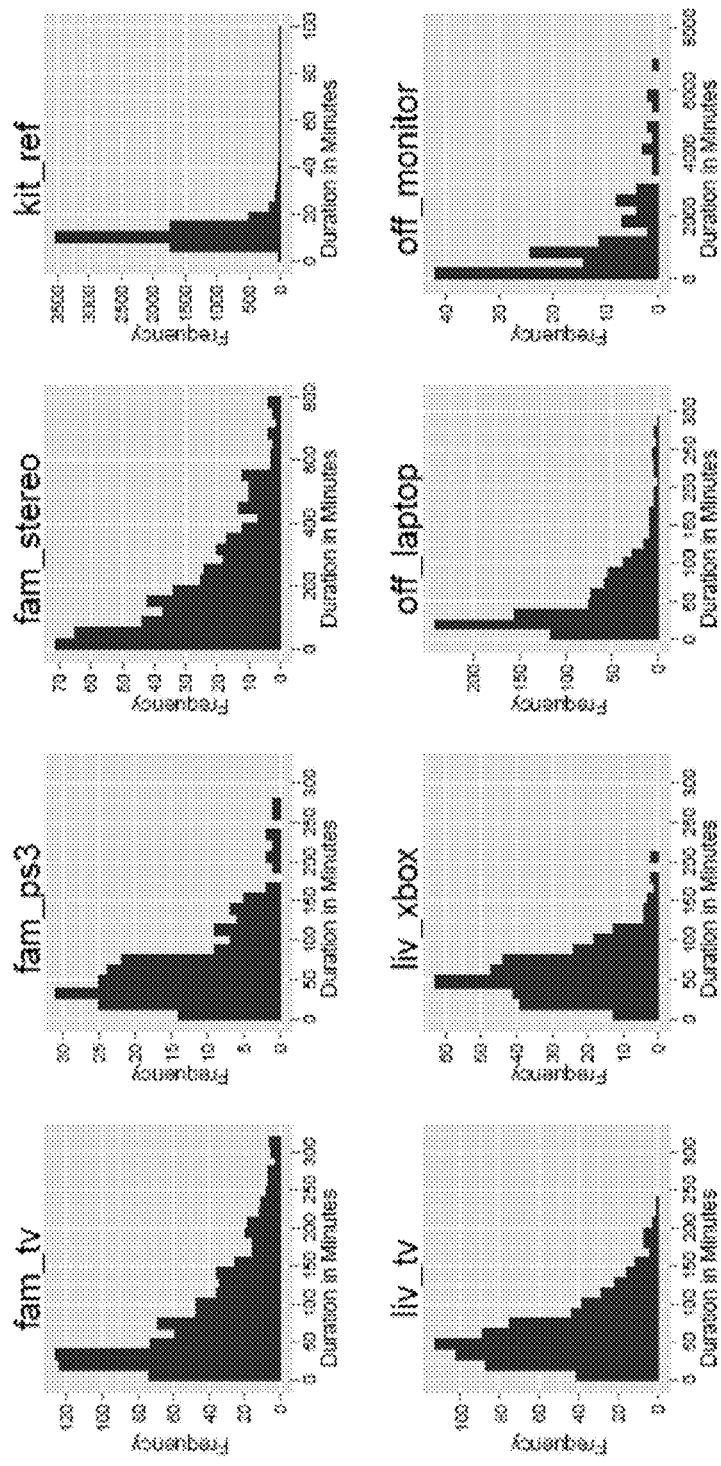
FIG. 4 are histograms of example appliance ON-durations.

HMMs were used to model the appliances, and to determine what probability distribution function accurately captures the ON-durations. The geometric distribution is used for state occupancy in regular HMMs. However, the histograms of ON-durations shown in FIG. 4 are not geometric. In geometric distributions, $Pr(d=x) \geq Pr(d=y) \Leftrightarrow x \leq y$. Thus, if the ON-state occupancy durations are modeled using a geometric distribution, it would mean using an appliance for only one second happens more frequently than using the appliance for one minute. It is noted that this property does not hold for many household appliances. As FIG. 4 shows, most of the peaks are not located in the first bin of the histograms. Thus, the ON-state occupancy durations should be modeled with a different (i.e., non-geometric) distribution.

Figure 5:
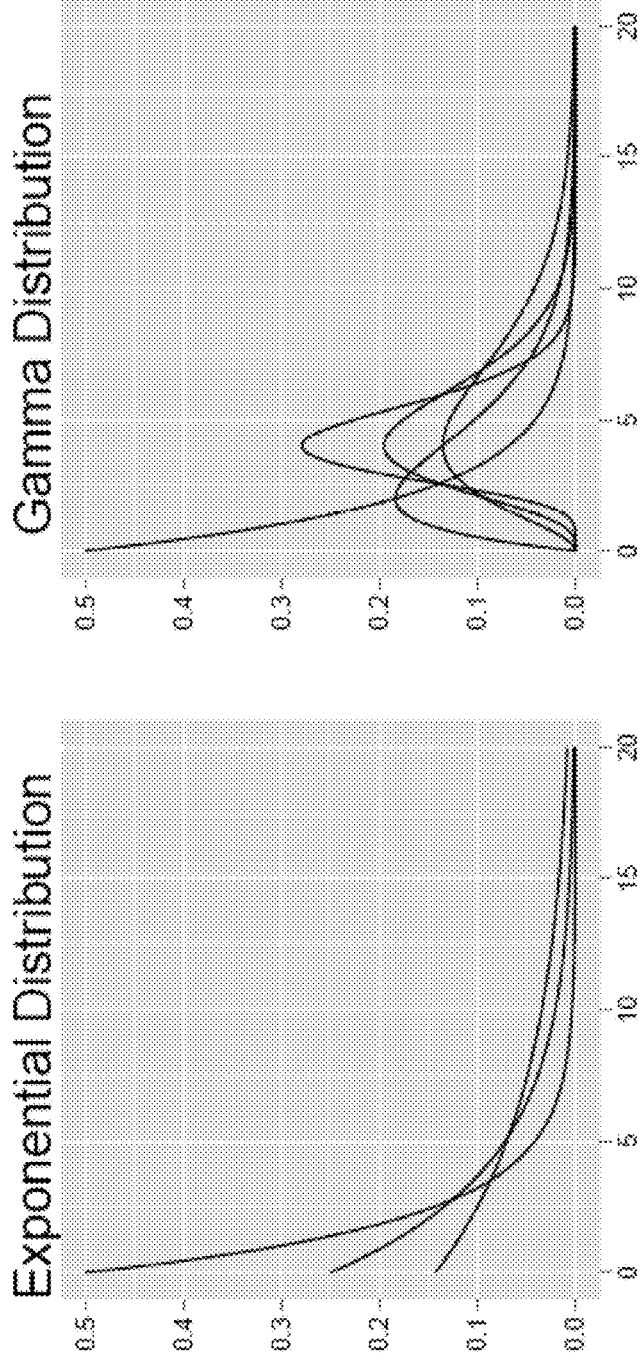
FIG. 5 are example exponential and gamma distributions.

The gamma distribution is closer to most ON-duration distributions. Since the gamma distributions have two parameters, it has more freedom in terms of the distribution shape. FIG. 5 shows exponential distributions, the equivalent of the geometric distribution in the continuous domain, and gamma distributions. The fitness of the gamma distribution is quantitatively compared with that of the exponential distribution.

For each appliance, a maximum likelihood estimation (MLE) is used for the ON-durations to estimate the parameters for the exponential distribution and gamma distribution. The fitness of these distributions on the data is compared using log-likelihood ratio (LLR):

$$LLR = \log\left(\frac{\max_{k,\theta} P(\text{durations}|\text{Gamma}(k, \theta))}{\max_{\lambda} P(\text{durations}|\text{Exp}(\lambda))}\right)$$

Table 2 shows that all LLR values are positive, and most are large. This indicates that the gamma distribution is a better fit than the exponential distribution for all appliances.

TABLE 2

Estimated parameters for exponential (λ) and gamma distributions (k,Θ), and LLR

| Label | λ | k | θ | LLR |
|---|---|---|---|---|
| fam_tv | 0.00991 | 1.804 | 38.307 | 17.29 |
| fam_ps3 | 0.01447 | 1.135 | 88.821 | 5.077 |
| fam_stereo | 0.00395 | 0.975 | 259.38 | 0.029 |
| kit_ref | 0.07783 | 5.895 | 2.1793 | 4151 |
| liv_tv | 0.01576 | 2.175 | 29.184 | 98.50 |
| liv_xbox | 0.01669 | 2.763 | 21.676 | 70.63 |
| off_laptop | 0.01840 | 1.371 | 39.633 | 26.73 |
| off_monitor | 0.00076 | 0.676 | 1945.2 | 7.143 |

Figure 6:
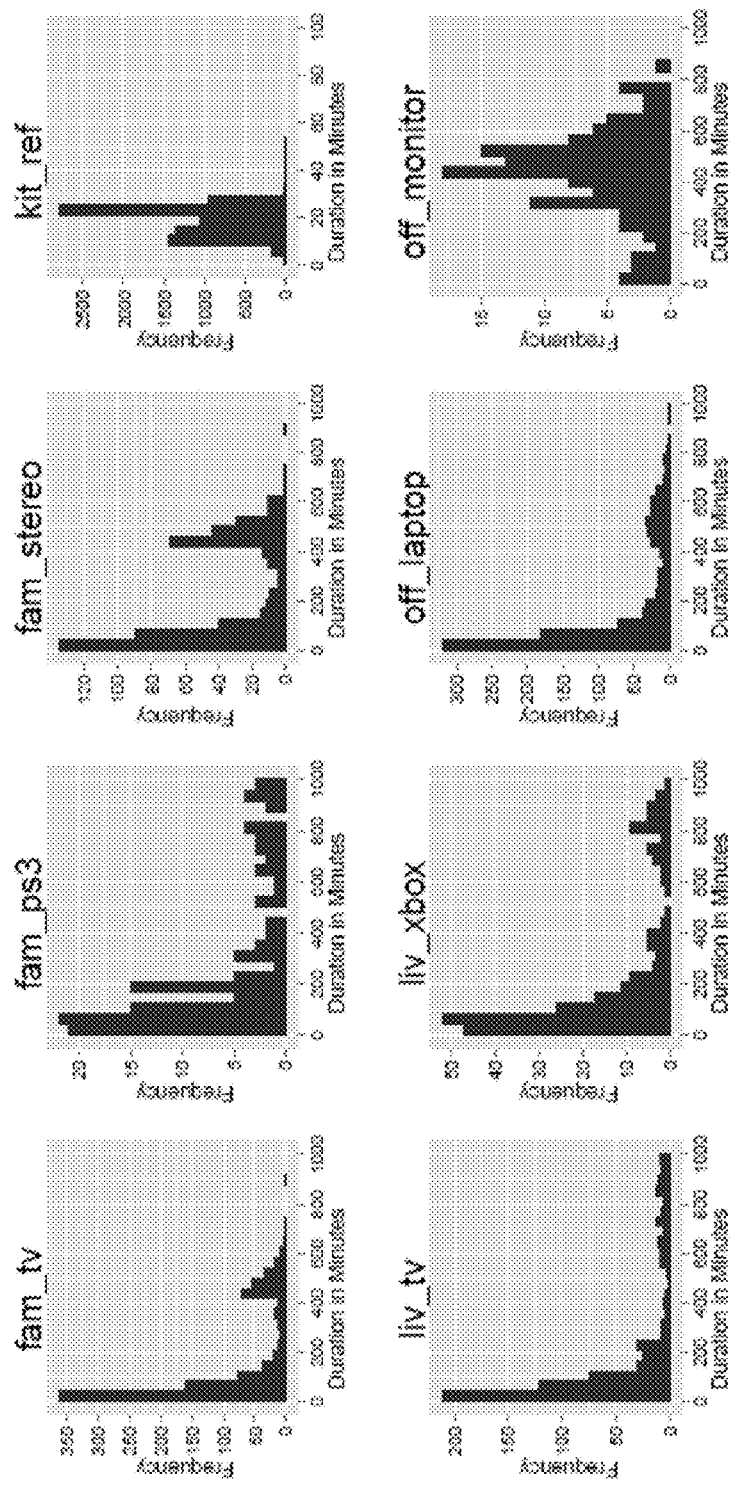
FIG. 6 are example histograms of appliance OFF-durations.

As shown in FIG. 6, there are generally two peaks in the OFF-duration distributions. The reason for the second peak is that most appliances are not used at night. This indicates the dependencies between time of a day and appliances. If the second peaks are removed, the OFF-duration fit in geometric distributions well.

Usage patterns of some appliances show strong correlation with those of others. For example, a gaming console cannot be used without a television, and a monitor cannot be used alone without a desktop or a laptop. These dependencies were tested in by measuring the correlations between every pair of appliances.

Figure 7:
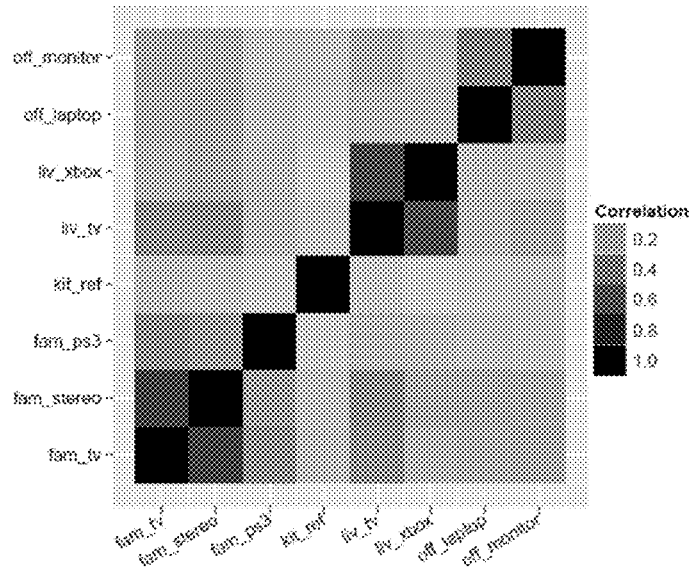
FIG. 7 shows example correlations between the appliances.

FIG. 7 shows the Pearson's coefficients of all pairs of appliances as a heatmap. The figure shows that there are four groups of strongly correlated appliances: {fam_tv, fam_stereo, fam_ps3}, {kit_ref}, {liv_tv, liv_xbox}, {off_laptop, and off_monitor}. Further, "liv_tv" and "fam_tv" are correlated, which implies that the family members in the house usually watch televisions at similar times. The conditional probabilities for every pair of appliances were computed. The pairs with conditional probability greater than 0.9 are: P(fam_tv|fam_ps3)=0.963, P(fam_stereo|fam_tv)=0.944, P(fam_stereo|fam_ps3)=0.998, P(liv_tv|liv_xbox)=0.990, and P(off_monitor|off_laptop)=1.000.

The results demonstrate that strong dependencies exist between appliances. Thus, these dependencies can be used as features for disaggregation.

Figure 8:
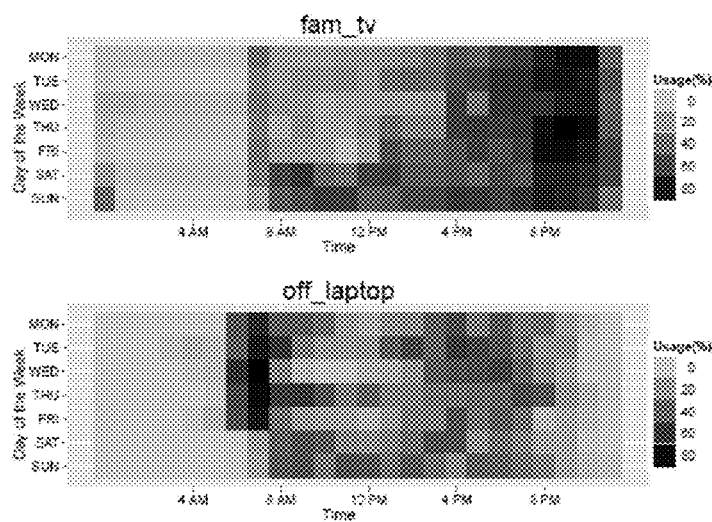
FIG. 8 shows example daily and weekly usage patterns of appliances.

Power load disaggregation can be enhanced if additional inputs that indirectly relate to the state of an appliance are available. This example focuses on inputs that do not need additional instrumentation. For example, people tend to have daily and weekly patterns in their activities. Thus, the use of appliances is also expected to have temporal patterns. FIG. 8 shows the usage (darker squares indicate periods of higher usage) of "fam_tv" and "off_laptop" for each day of a week, aggregated over 6 months. FIG. 8 shows that the TV is watched more at night and on weekends. The laptop is used every weekday morning. Other applications also exhibit temporal usage patterns (not shown). Thus, time of day and day of the week are useful features.

In this example, only time of data and day of week were considered as additional features, as this information does not need additional instrumentation to be used. However, the models discussed herein may also be used to integrate other features, if the information is available. For example, the outside temperature strongly correlates with the use of heating or air conditioning. Similarly, sound, light or vibration sensors can help identify a variety of appliances.

Probabilistic models of the appliance behaviors integrate the stable-state features described above. Further, learning the parameters of these models is unsupervised, which is highly desirable for residential power disaggregation, as labeled data is not needed, thereby simplifying deployment of the systems and methods described herein.

Being variants of HMM, these models are generative. That is, a probabilistic model is defined that explains the generating process of the observed data. These models can contain hidden variables that are not observed. For example, the states of appliances may be hidden variables, and the aggregate power load may be the observation.

The models have several parameters that can be learned from the data. The learning process includes estimating the parameters from the observations such that the model can best describe the observations. Then, using the model with these parameters, the hidden variables are estimated, which are the states of the appliances. An example algorithm is described by the following algorithm.

---

Algorithm 1 The Generative Approach with Hidden Variables

---

1: $\lambda \leftarrow$ Initial parameters
2: repeat
3: $\quad \lambda' \leftarrow \lambda$
4: $\quad \lambda \leftarrow \arg\max_\lambda E [\log P(Y, q|\lambda)|Y, \lambda']$
5: until $\lambda$ converges
6: $q^* \leftarrow \arg\max_q P(q|\lambda, Y)$

---

First, the parameters are initialized. For a given observation Y, the parameters are estimated in a model by an Expectation-Maximization technique (and associated algorithm) (EM: Line 2-5). Then, the hidden states are estimated by using Maximum Likelihood Estimation (MLE: Line 6).

As a base model, a factorial hidden Markov model (FHMM) is chosen. Based on the observations discussed above, three variants are created, which are described next.

An inherent feature with FHMMs is that a state occupancy duration is constrained to be geometrically distributed. However, the ON-durations are modeled better with a gamma distribution. Modeling state occupancy durations in HMMs has been studied. The models are called Hidden Semi-Markov Model (HSMM) or Non-Stationary Hidden Markov Model (NSHMM). Factorial Hidden Semi-Markov Model (FHSMM) is defined as the model obtained by combining the method of modeling state occupancy durations in HSMM with FHMM.

FHMMs do not consider additional features such as time of day, day of week, or input from other sensors. To use these, a Conditional Factorial Hidden Markov Model (CFHMM) is used, where the transition probabilities are not constant but are conditioned on the extra features. This model is similar to a coupled hidden Markov model (CHMM). However, CFHMMs have a more general form, as these consider the dependencies between hidden state sequences and the additional input sequences.

FIG. 9 shows the relationship of these two models with FHMM. Next, FHSMM and CFHMM are combined to create the Conditional Factorial Hidden Semi-Markov Model (CF-HSMM).

Figure 10:
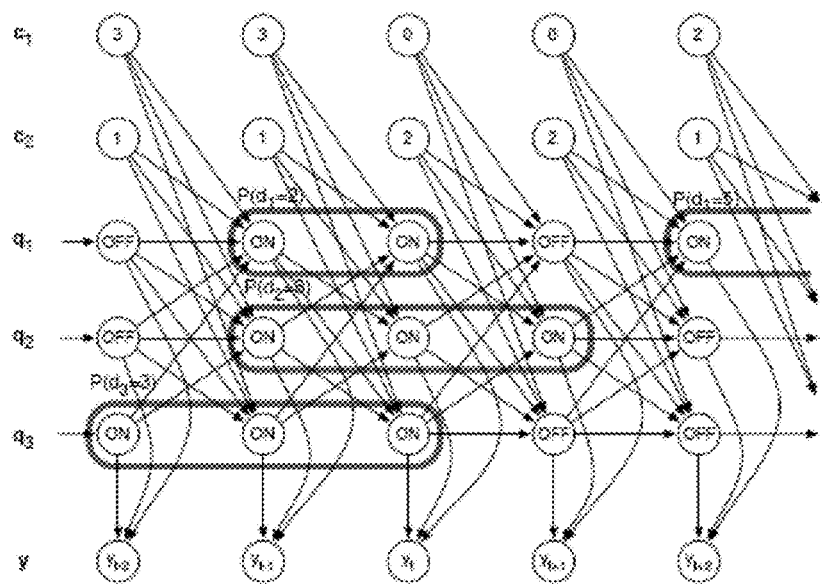
FIG. 10 shows a graphical representation of CFHSMM.

The FHMM model is extended to create the Conditional Factorial Hidden Semi-Markov Model (CFHSMM). This new model has the advantages of both FHSMM and CFHMM. FIG. 10 shows the graphical representation of CFHSMM. Here, c1, c2, . . . cK represent the additional features. Further, the model uses a gamma distribution for ON-durations. Lastly, the state of an appliance at time t also depends on the states of other appliances, and the additional features at time (t−1). This extension allows the model to consider the dependencies between appliances and the dependencies on additional features.

There are several parameters in the model:

$\pi_j^{(i)}$, the initial probabilities, $P(q_1^{(i)}=j)$ $f_{jkl}^{(i)}$, the conditional probability for feature k of value l, $P(c_{t-1}^{(k)}=l|q_t^{(i)}=j)$ $m_{jkl}^{(i)}$, the conditional probability for appliance k of state l, $P(q_{t-1}^{(k)}=l|q_t^{(i)}=j)$ $\mu^{(i)}$, the mean of the power consumption for the appliance i.

$\kappa^{(i)}$ and $\theta^{(i)}$, the parameters for the gamma distribution of ON-state duration For a given set of parameter $\lambda$, the joint probability of the observation sequence Y and the set of the state sequences q is the product of the initial probability, the emission probability, and the transition probability.

$$P(Y,q|\lambda)=\psi_{in}(Y,q|\lambda)\cdot\psi_e(Y,q|\lambda)\cdot\psi_t(Y,q|\lambda)$$

The initial probability is $$\psi_{in}(Y, q|\lambda) = \prod_{i=1}^{M} \pi_{q_1^{(i)}}^{(i)}$$

The emission probability is $$\psi_e(Y, q|\lambda) = \prod_{t=1}^{T} b_{q_t}(y_t)$$

The transition probability is $$\psi_t(Y, q|\lambda) =$$

$$\prod_{i=1}^{M} \prod_{t:q_t^{(i)}=0} \left(\left(\prod_{j=1}^{M} m_{q_{t+1}^{(i)}, jq_t^{(j)}}^{(i)}\right)\left(\prod_{j=1}^{K} f_{q_{t+1}^{(i)}, jc_t^{(j)}}^{(i)}\right)\right) \prod_{t:q_t^{(i)}=1} \left(\left(\prod_{j=1;i\neq j}^{M} m_{q_{t+1}^{(i)}, jq_t^{(j)}}^{(i)}\right)\right.$$

$$\left.\left(\prod_{j=1}^{K} f_{q_{t+1}^{(i)}, jc_t^{(j)}}^{(i)}\right)\right)\prod_{t:q_t^{(i)}=1, q_{t-1}^{(i)}=0} P(d=l_t^{(i)}|\kappa^{(i)}, \theta^{(i)})$$

Where $l_t^{(i)}$ is the length of the ON-state subsequence of the appliance i starting at time t. All these parameters can be estimated using the Expectation Maximization (EM) algorithm. EM iteratively re-estimates the parameter values using an "auxiliary function" until convergence to a local maximum occurs. The auxiliary function to be maximized is:

$$\phi(\lambda, \lambda') = \sum_q P(Y, q \mid \lambda') \log P(Y, q \mid \lambda)$$

Where $\lambda'$ is the set of the parameters in the previous iteration. In each iteration, the EM algorithm performs the expectation (E-step) and maximization (M-step). In the E-step, the conditional distribution $P(Y,q/\lambda')$ is determined. Then, in the M-step, the parameters are updated to be arg $\max_\lambda \phi(\lambda,\lambda')$. The auxiliary function becomes:

$$\phi(\lambda, \lambda') = \sum_q P(Y, q \mid \lambda') \log \psi_{in}(Y, q \mid \lambda) + \sum_q P(Y, q \mid \lambda') \log \psi_e(Y, q \mid \lambda) + \sum_q P(Y, q \mid \lambda') \log \psi_t(Y, q \mid \lambda)$$

Since all the three terms do not have parameters in common, they can be maximized separately. For the first term:

$$\sum_q P(Y, q \mid \lambda') \log \psi_{in}(Y, q \mid \lambda) = \sum_q P(Y, q \mid \lambda') \sum_{i=1}^M \log \pi_{q_1^{(i)}}^{(i)} = \sum_{i=1}^M \sum_q \log \pi_{q_1^{(i)}}^{(i)} P(Y, q \mid \lambda')$$

Now, the term of each appliance can be maximized separately. For $i \in \{1, 2, \ldots M\}$, $$\sum_q \log \pi_{q_1^{(i)}}^{(i)} P(Y, q \mid \lambda') = \sum_{j \in \{0,1\}} \log \pi_j^{(i)} P(Y, q_1^{(i)} = j \mid \lambda')$$

by using marginal expression for time t=1 in the right hand side. Adding the Lagrange multiplier, using the constraint that $\pi_0^{(i)} + \pi_1^{(i)} = 1$, and setting the derivative equal to zero, yields:

$$\pi_j^{(i)} = \frac{P(Y, q_1^{(i)} = j \mid \lambda')}{P(Y \mid \lambda')}, \forall j$$

Similarly for $i \in \{1, 2, \ldots M\}$, $$m_{jkl}^{(i)} = \frac{\sum_{t=1}^{T-1} P(Y, q_t^{(k)} = l, q_{t+1}^{(i)} = j \mid \lambda')}{\sum_{t=1}^{T-1} P(Y, q_{t+1}^{(i)} = j \mid \lambda')}, \forall j, k, l$$

$$f_{jkl}^{(i)} = \frac{\sum_{t=1}^{T-1} P(Y, c_t^{(k)} = l, q_{t+1}^{(i)} = j \mid \lambda')}{\sum_{t=1}^{T-1} P(Y, q_{t+1}^{(i)} = j \mid \lambda')}, \forall j, k, l$$

For the emission probability, as mentioned above, the Gaussian distribution is used. However, the variance of the power consumption for appliances is assumed to be the same. When the variances are left as free variables, there is the possibility of over-fitting. One possible explanation is that most of the errors or noise are caused by a sensor, not by appliances. This assumption also makes it much simpler to estimate the emission parameters. The $\sigma$ is used to denote the fixed variation.

$$\phi_e(\lambda, \lambda') \equiv \sum_q P(Y, q \mid \lambda') \log \psi_e(Y, q \mid \lambda) = \sum_q P(Y, q \mid \lambda') \sum_{t=1}^T \log b_{q_t}(y_t) = \sum_q P(Y, q \mid \lambda') \sum_{t=1}^T \left( \frac{\log 2\pi\sigma^2}{2} - \frac{\left(y_t - \sum_{i=1}^M q_t^{(i)} \mu^{(i)}\right)^2}{2\sigma^2} \right)$$

Then, $$\frac{\partial \phi_e(\lambda, \lambda')}{\partial \mu^{(i)}} = \sum_{t=1}^T y_t q_t^{(i)} P(Y, q \mid \lambda') - \sum_{t=1}^T \sum_{j=1}^M \mu^{(j)} q_t^{(i)} q_t^{(j)} P(Y, q \mid \lambda') = 0$$

Let $\langle q_t^{(i)} \rangle = \sum_q q_t^{(i)} P(Y, q \mid \lambda')$, and $\langle q_t^{(i)} q_t^{(j)} \rangle = \sum_q q_t^{(i)} q_t^{(j)} P(Y, q \mid \lambda')$.

Then, Equation 4.2 becomes:

$$\frac{\partial \phi_e(\lambda, \lambda')}{\partial \mu^{(i)}} = \sum_{t=1}^T y_t \langle q_t^{(i)} \rangle - \sum_{t=1}^T \sum_{j=1}^M \mu^{(j)} \langle q_t^{(i)} q_t^{(j)} \rangle = 0$$

These can be solved by the normal equations:

$$\mu = \left[ \sum_{t=1}^T \langle q_t q_t^T \rangle \langle q_t q_t^T \rangle \right]^{-1} \left[ \sum_{t=1}^T \langle q_t q_t^T \rangle \langle q_t \rangle y_t \right]$$

where $q_t = [q_t^{(1)} \; q_t^{(2)} \; \ldots \; q_t^{(M)}]$, $\langle q_t q_t^T \rangle = \sum_q q_t q_t^T P(Y, q \mid \lambda')$ and $\langle q_t \rangle = \sum_q q_t P(Y, q \mid \lambda')$.

Lastly, $k^{(i)}$ and $\beta^{(i)}$ parameters are optimized. Since there are no closed-form equations for estimating $k^{(i)}$ and $\theta^{(i)}$, these are estimated numerically by the Newton-Raphson method. Let:

$$s^{(i)} = \log E[d^{(i)} \mid Y, \lambda'] - E[\log d^{(i)} \mid Y, \lambda']$$

$$= \log \sum_q \sum_{t: q_{t-1}^{(i)} = 0, q_t^{(i)} = 1} l_t^{(i)} P(Y, q \mid \lambda') / P(Y \mid \lambda') - \sum_q \sum_{t: q_{t-1}^{(i)} = 0, q_t^{(i)} = 1} \log l_t^{(i)} P(Y, q \mid \lambda') / P(Y \mid \lambda')$$

Where $d^{(i)}$ is the random variable for the ON-state occupancy duration and $l_t^{(i)}$ is the length of the ON-state subsequence of the appliance 1 starting at time t.

Then, initializing $k^{(i)} = s^{(i)}$ and interactively updating $k^{(i)}$ by the following equation:

$$\kappa^{(i)} = \kappa^{(i)} - \frac{\log \kappa^{(i)} - \psi(\kappa^{(i)}) - s^{(i)}}{1/\log \kappa^{(i)} - \psi'(\kappa^{(i)})}$$

Where $\psi$ is the digamma function and $\psi'$ is the trigamma function. After iteratively estimating $k^{(i)}$, set:

$$\theta^{(i)} = E[d^{(i)} | Y, \lambda'](\kappa^{(i)})^{-1}$$
$$= \left( \sum_q \sum_{t: q_{t-1}^{(i)}=0, q_t^{(i)}=1} t_t^{(i)} \frac{P(Y, q | \lambda')}{P(Y | \lambda')} \right) (\kappa^{(i)})^{-1}$$

These updating equations complete the M-step in our EM algorithm. In contrast to the M-step, the exact inference of the conditional distribution $P(Y, q|\lambda')$ in the E-step is computationally intractable.

It is noted that there are alternative ways to approximate the inference, including but not limited to Gibbs sampling and the mean field approximation. Here, Gibbs sampling is used, one of the Monte Carlo methods, because of its simplicity. Since Gibbs sampling is a well-known tool and easy to adapt to any model, details are omitted herein.

A goal of the energy load disaggregation is to discover the states of appliances. Sequences of the hidden variables in the CFHSMM are more interesting than the parameters in the model. After learning the parameters, Maximum Likelihood Estimation (MLE) is used to estimate the sequences of the hidden variables.

In other words, q* is found such that:

$$q^* = \underset{q}{\mathrm{argmax}} P(Y, q | \lambda)$$

The Viterbi techniques (and associated algorithm) can efficiently estimate the hidden states for HMMs. This algorithm uses dynamic programming to solve the optimization. However, dynamic programming for CFHSMMs is computationally intractable. Thus, simulated annealing (SA) is used to find q*. SA is a known technique, and therefore is not explained in detail herein.

The setup described in the example above, monitored power consumption from seven residential homes. This is just one example. As mentioned earlier, the techniques are agnostic to how the power consumption is measured and how the data is aggregated, stored, etc.

Figure 11:
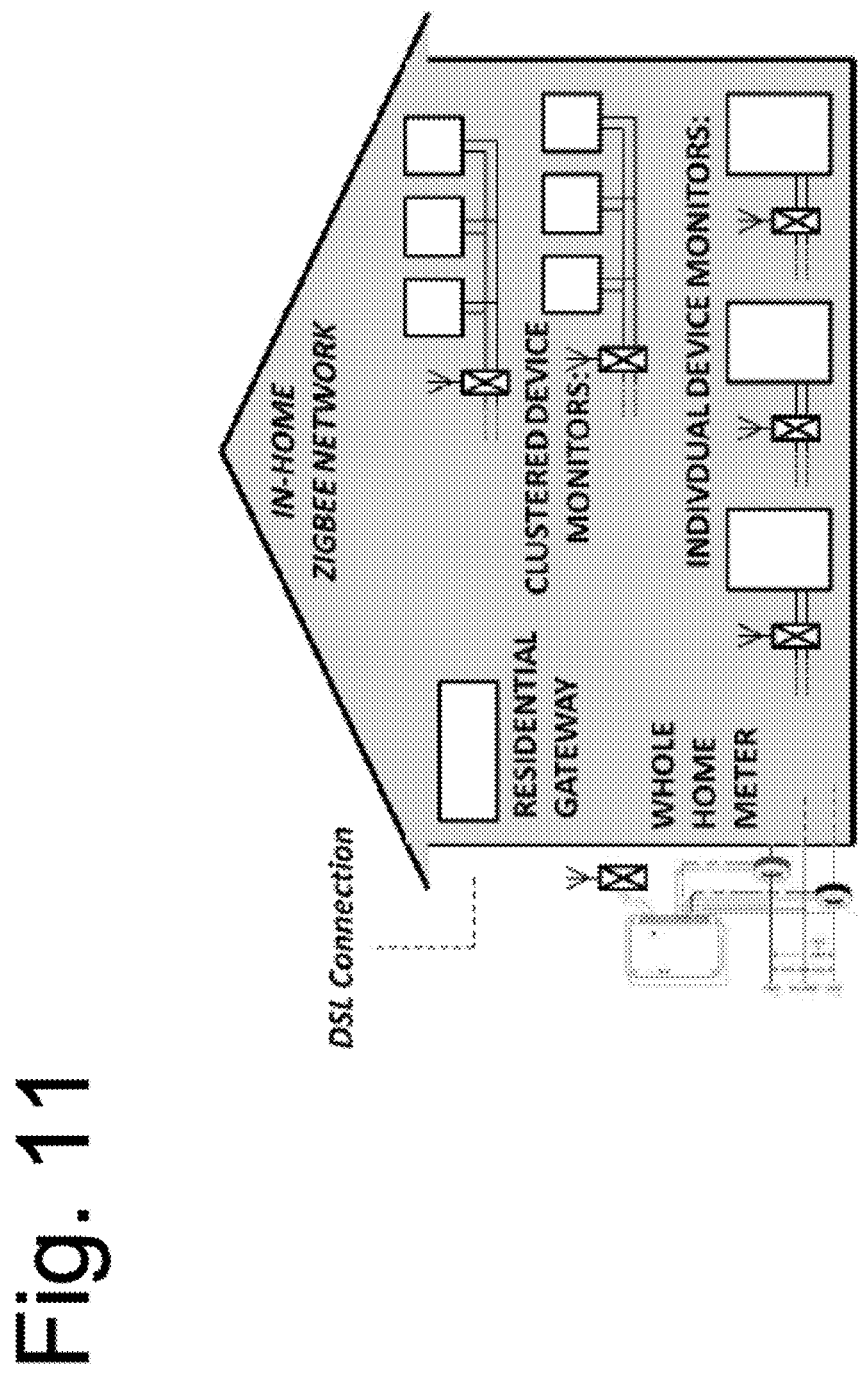
FIG. 11 shows an example in-home sensing topology.

In this example, a mix of sensing nodes was installed at each house, each containing a Zigbee (www.zigbee.org) radio transceiver, collectively forming an in-home wireless sensor network using Digi (www.digi.com) components. FIG. 11 illustrates the residential deployment topology for this example. As I mentioned earlier, the deployment used for this example was designed to validate the disaggregation results. It is noted that this is not necessarily the deployment topology that would be used in a wide-scale use of the disaggregation technique.

The topology includes a whole-home meter to determine overall electrical energy use (a smart meter proxy), several individual energy monitoring nodes (typically attached to larger appliances), and several clustered energy monitoring nodes to capture the aggregate consumption from grouped devices, such as an entertainment center. Power data was collected every 3 seconds. A residential gateway connected to a DSL line enabled remote management of the devices and collection of the power measurements. Data from individual device monitors was combined to create the datasets.

Accuracy is a commonly used evaluation metric. However, with power disaggregation the state distribution is skewed because using an appliance is a relatively rare event. Therefore, accuracy is not an appropriate metric for evaluating power load disaggregation because a model that always says all the appliances are off can achieve high accuracy.

Instead, a metric was adapted from the information retrieval domain, F-measure. In the information retrieval domain, the common task is to classify relevance of documents for a given query. Because relevant documents are relatively rare, evaluation metrics in the information retrieval consider skewed classes.

F-measure is widely used in this type of evaluation. In binary classification tasks, there are four possible outcomes from a binary classifier: true positive (TP), true negative (TN), false positive (FP), and false negative (FN). F-measure is the harmonic mean of Precision and Recall. Precision is defined as:

$$\frac{TP}{TP + FP}$$

Recall is defined as:

$$\frac{TP}{TP + FN}$$

The following process was used to apply F-measure by converting the method to a binary classifier, such that if the power consumption of an appliance is greater than 0, the output label is positive, and otherwise the output label is negative. However, the task is not only classifying the states of an appliance, but predicting how much power is consumed. Therefore, among true positives, predictions that differ significantly from ground truth are considered incorrect. More specifically, the true positives are split into two categories: (1) accurate true positive (ATP), and (2) inaccurate true positive (ITP). The predictions are distinguished as follows. Let x be the predicted value, and $x_0$ be the ground truth value.

When $x = 0$ and $x_0 = 0$, the prediction is true negative (TN).
When $x = 0$ and $x_0 > 0$, the prediction is false negative (FN).
When $x > 0$ and $x_0 = 0$, the prediction is false positive (FP).

When $x > 0$, $x_0 > 0$, and $\frac{|x - x_0|}{x_0} \leq \rho$, the prediction is an accurate true positive (ATP).

When $x > 0$, $x_0 > 0$, and $\frac{|x - x_0|}{x_0} > \rho$, the prediction is an inaccurate true positive (ITP).

where $\rho$ is a threshold.

Precision and Recall are redefined such that:

$$\mathrm{Precision} = \frac{ATP}{ATP + ITP + FP}$$

-continued $$Recall = \frac{ATP}{ATP + ITP + FN}$$

F-measure remains the harmonic mean of the new Precision and Recall. The new F-measure is used as the metric with $\rho=0.2$ in the evaluation.

Next, two synthetic data sets were created to test the effectiveness of ON-duration shape as a feature. Two independent time-series data were generated with the same power consumption, ON-duration mean, OFF-duration mean, OFF-duration shape, but different ON-duration shape.

Figure 12:
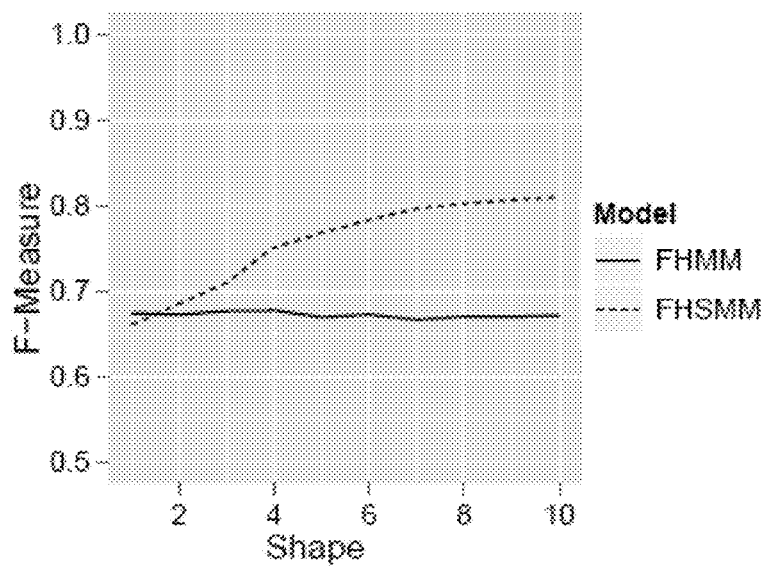
FIG. 12 is a plot showing the effectiveness of ON-duration shape.

Each of the synthetic data sets has a power consumption of 100 W, mean ON-duration of 30 time units, mean OFF-duration of 60 time units, and OFF-duration shape parameter of 1. The first data set has ON-duration shape parameter of 1, while the second has various ON-duration shape parameters from 1 to 10. The shape of a gamma distribution changes from the shape of an exponential distribution to the shape of a Gaussian distribution as its shape parameter increases. Thus, as the value of the shape parameter gets larger, the difference between the two shapes of ON-durations increases. As shown in FIG. 12, FHSMM performs better as the shape parameter increases, but FHMM shows no change.

The gains resulting from modeling the appliance dependencies and additional features were also evaluated. In this evaluation, two groups of appliances were chosen that have strong correlations to other appliances: {fam_tv, fam_ps3, fam_stereo}, and {liv_tv, liv_xbox}. Then, all the appliances were scaled to have the same power consumption, and generated all the possible combinations of these five appliances for the test data. The appliances were scaled to the same power so that power level becomes ineffective as a feature for disaggregation. There were 26 test data with at least two appliances. For each test data, the F-measure of FHMM and CFHMM was evaluated. The averages are 0.734 for FHMM and 0.838 for CFHMM. Table 3 lists the top 10 test cases where maximum improvement was seen through use of CFHMM.

TABLE 3

Top 10 most improved test data

| Testdata | FHMM | CFHMM |
|---|---|---|
| fam_tv, fam_ps3, fam_stereo | 0.717 | 0.985 |
| fam_tv, liv_tv, liv_xbox | 0.621 | 0.862 |
| fam_tv, fam_ps3, liv_tv, liv_xbox | 0.524 | 0.718 |
| fam_tv, fam_stereo, liv_tv, liv_xbox | 0.680 | 0.867 |
| fam_tv, fam_ps3, liv_tv | 0.562 | 0.744 |
| fam_tv, fam_ps3, fam_stereo, liv_tv | 0.621 | 0.803 |
| fam_tv, fam_stereo, liv_xbox | 0.724 | 0.881 |
| All 5 appliances | 0.594 | 0.751 |
| liv_tv, liv_xbox | 0.854 | 0.999 |
| fam_tv, fam_ps3, fam_stereo, liv_xbox | 0.590 | 0.731 |

These evaluations show the effectiveness of modeling the dependencies between appliances and the additional features. For {liv_tv, liv_xbox} testdata, CFHMM disaggregated the load perfectly because the model inferred the appliance dependency of "liv_xbox" to "liv_tv" (i.e., a game console such as an Xbox is used with a TV).

The performance of these models was tested on all the seven homes from which data was collected. Table 4 shows the results.

TABLE 4

Evaluations on several homes

| Home ID | Num. of Appliances | FHMM | CFHSMM |
|---|---|---|---|
| Home 1 | 4 | 0.983 | 0.998 |
| Home 2 | 6 | 0.899 | 0.930 |
| Home 3 | 6 | 0.859 | 0.881 |
| Home 4 | 7 | 0.625 | 0.693 |
| Home 5 | 8 | 0.713 | 0.781 |
| Home 6 | 8 | 0.641 | 0.722 |
| Home 7 | 10 | 0.796 | 0.874 |

Even though more than 20 appliances were monitored in each house, there are fewer appliances in the data sets because the other appliances were not active, that is, either these appliances were never turned on, or were always on. The always-on loads form part of the base load (also commonly called "vampire" load). Most of the power load disaggregation techniques and associated algorithms (including ours) cannot disaggregate base load since disaggregation is based on the characteristics of the appliance power state changes.

Figure 13:
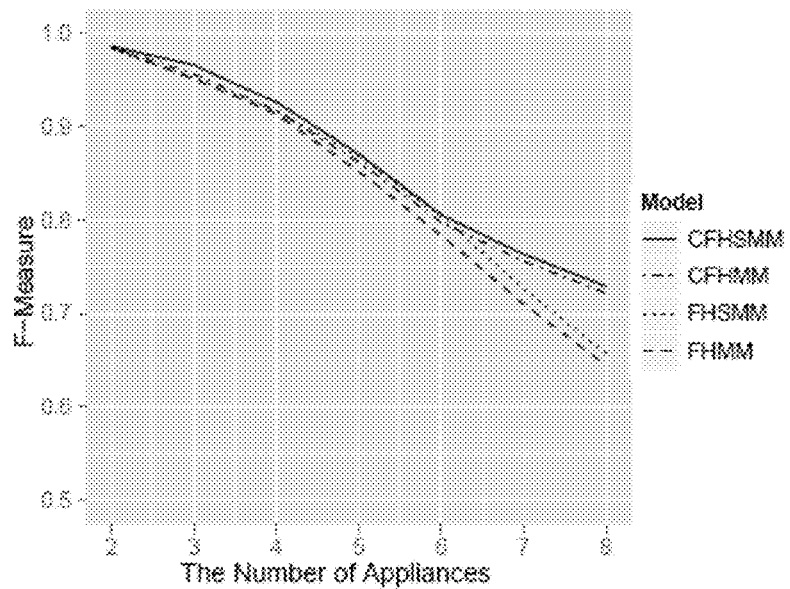
FIG. 13 is a plot showing performance of the models with respect to the number of appliances.

FIG. 13 shows the F-measure of the four models versus the number of appliances. CFHSMM performs better in all cases although the difference is more pronounced for a larger number of appliances. The difference between the performance of CFHSMM and CFHMM is minimal, indicating that for this data set, most of the gain in performance of CFHSMM comes from additional features considered rather than use of the gamma distribution for ON-durations.

It is readily appreciated from the above discussion that the systems and methods may be utilized to provide a quick assessment of a large amount of information for a wide variety of different energy-consuming devices, and with high accuracy. The systems and methods may be used to modify the energy consumption patterns of many different consumers, such as residential and commercial building occupants, by providing device-specific feedback.

These considerations are relevant to consumers who want to reduce energy costs, in addition to those who are becoming more conscious of the impact their own consumption has on the environment.

Before continuing, it should be noted that the examples described above are provided for purposes of illustration, and are not intended to be limiting. Other devices and/or device configurations may be utilized to carry out the operations described herein.

By way of illustration, regarding use of Gamma distribution for "on" durations, which worked well for the appliances/data in the above example, any other probability distribution may also be used. Selection of an appropriate probability distribution may depend, for example, on the characteristics of the appliances/devices that are disaggregated.

In another illustration, the basic FHMM model is explained as it may be extended in two dimensions, i.e., to incorporate a different "on" duration shape, and a conditional model to incorporate additional features. However, there are other dimensions to which the model can also be extended. For example, a third dimension may be implemented to model a particular aspect of the data. While the emissions of the models explained above uses a Gaussian distribution and the same variance is assumed for all appliances, these parameters may be changed to derive distinct models.

In yet another illustration, unsupervised techniques enable disaggregation of the total consumption into "n" distinct appliances, the appliances are not identified. However, a library of appliance models may be used to compare the disaggregated output with the library to identify the appliances devices (e.g. by finding the closest match in the library).

Figure 14A:
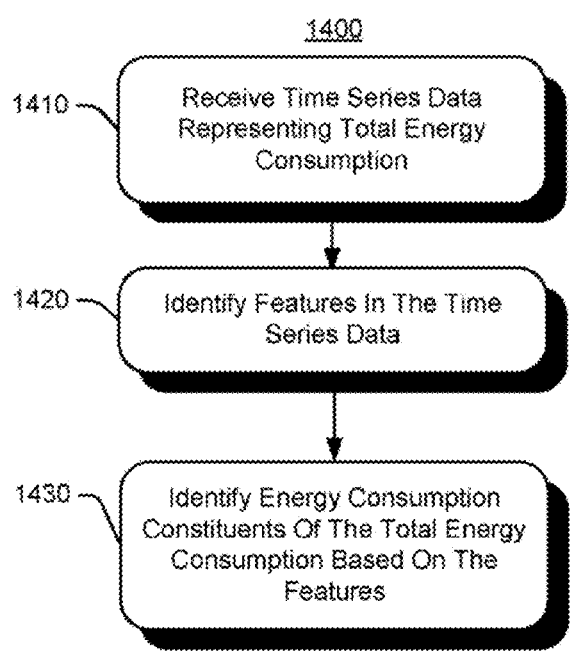
FIGS. 14*a*-*b* are flowcharts illustrating example operations of disaggregating power load.
Figure 14B:
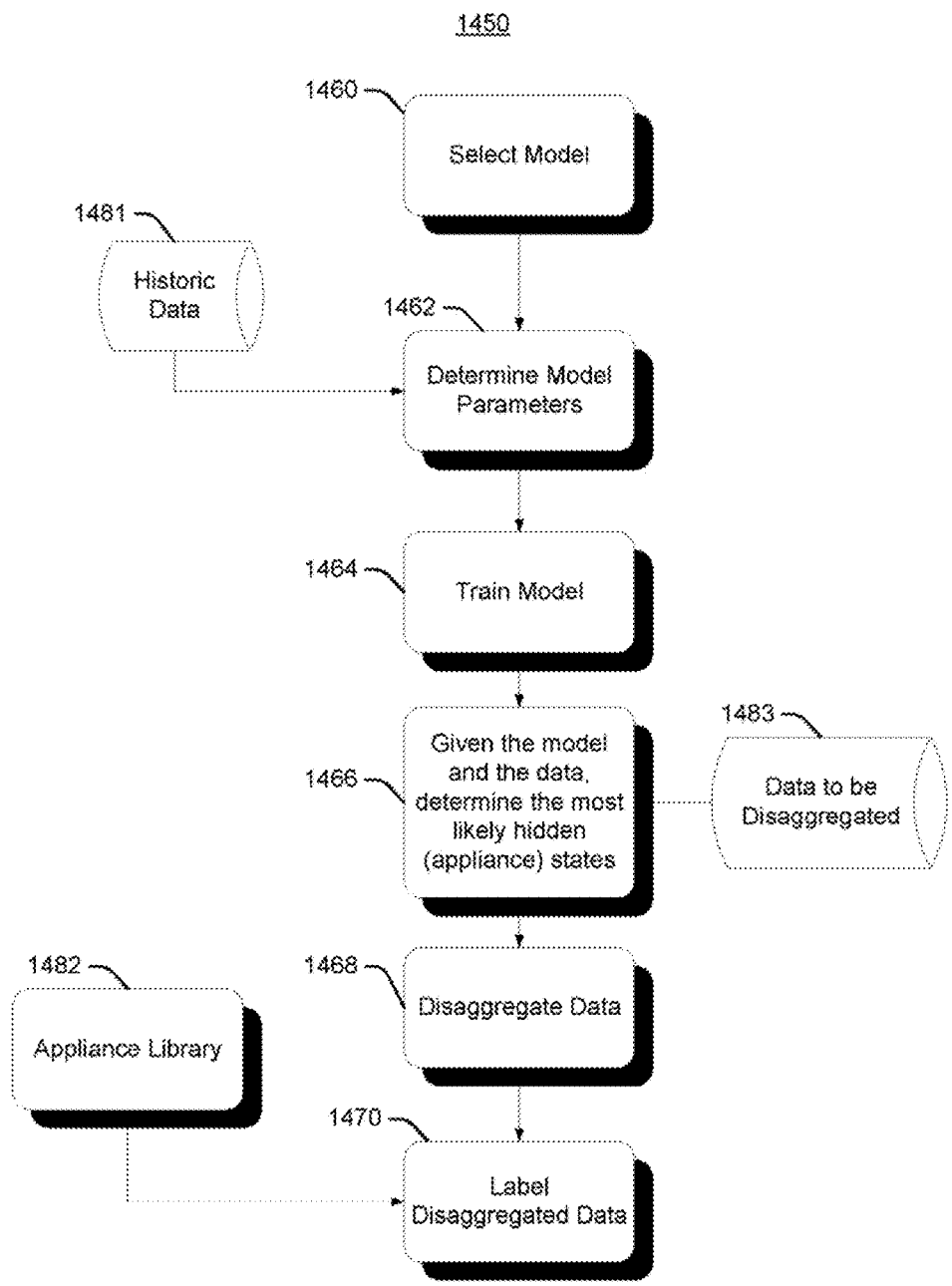

FIGS. 14a-b are a flowchart illustrating example operations of disaggregating power load which may be implemented. Operations 1400 and 1450 in FIGS. 14a and 14b, respectively, may be embodied as machine readable instructions on one or more computer-readable medium. When executed on a processor, the instructions cause a general purpose computing device to be programmed as a special-purpose machine that implements the described operations. In an example implementation, the components and connections depicted in the figures may be used.

An example of a method of disaggregating power load may be carried out by program code stored on non-transient computer-readable medium and executed by a processor.

As shown in FIG. 14a, in operation 1410 time series data is received representing total energy consumption. In operation 1420, distinguishing features in the time series data are identified. In operation 1430, energy consumption constituents of the total energy consumption are identified based on the features.

The time series data may be sampled at a low frequency, for example, a sampling frequency of about 1 Hz. In addition, the time series data is collected unsupervised, for example, without the need for labeled data.

It is noted that various of the operations described herein may be automated or partially automated. Alternatively, at least some user interaction may be provided. The level of user interaction may be any suitable degree.

In an example, the disaggregating power load operations may be implemented with a user interface (e.g., for display on a home computer, television, or dedicated appliance). The user is able to make predetermined selections, and the operations described above are implemented on a back-end processing device to present the user with various information that the consumer can use to change their energy consumption.

The operations discussed above are provided to illustrate various examples of disaggregating power load. It is noted that the operations are not limited to the ordering shown. Still other operations may also be implemented.

For purposes of illustration, further operations may also include identifying energy consumption constituents based on a Factorial Hidden Semi-Markov Model (FHSMM). Still further operations may also include identifying energy consumption constituents based on a Conditional Factorial Hidden Markov Model (CFHMM).

Other operations may include identifying energy consumption constituents is based on a combination Factorial Hidden Semi-Markov Model (FHSMM) and Conditional Factorial Hidden Markov Model (CFHMM). For example, identifying energy consumption constituents may be based on a Conditional Factorial Hidden Semi-Markov Model (CFHSMM).

Still other operations are illustrated in FIG. 14b. In operation 1460 a model may be selected (e.g., the CFHSMM model described in more detail above). In operation 1462, model parameters may be determined. In an example, the model parameters are determined based at least in part on historical data 1481 (e.g., total consumption, timestamp, and other sensor measurements). In operation 1464, the model may be trained (e.g., parameters may be defined for using the model). In operation 1466, the model may be used to identify the most likely "hidden" appliance states in the data 1483 to be disaggregated (e.g., based on last hour, last day). The data may be disaggregated in operation 1468. Then the disaggregated data may be labeled in operation 1470 by matching or otherwise associating the data with information in a library of appliance models 1482.

It is noted that the examples shown and described are provided for purposes of illustration and are not intended to be limiting. Still other embodiments are also contemplated.

The invention claimed is:

1. A disaggregating power load method, the method carried out by program code stored on non-transient computer-readable medium and executed by a processor, the method comprising:
   receiving time series data representing total energy consumption;
   identifying distinguishing, features in the time series data;
   identifying energy consumption constituents of the total energy consumption based on the features; and
   wherein ON-durations of an appliance are modeled using a gamma distribution, and a state of the appliance is dependent at least in part on a state of at least one other appliance.

2. The method of claim 1, further comprising:
   using the features to select a model;
   using historic data to determine model parameters; and
   using the model and model parameters to identify the energy consumption constituents.

3. The method of claim 1, wherein the me series data is analyzed without training data.

4. The method of claim 1, wherein identifying energy consumption constituents is based on a Factorial Hidden Semi-Markov Model (FHSMM).

5. The method of claim 1, wherein identifying energy consumption constituents is based on a Conditional Factorial Hidden Markov Model (CFHMM).

6. The method of claim 1, wherein identifying energy consumption constituents is based on a combination Factorial Hidden Semi-Markov Model (FHSMM) and Conditional Factorial Hidden Markov Model (CFHMM).

7. The method of claim 1, wherein stable state signatures are used for identifying features in the time series data, the stable state signatures include: time and date patterns.

8. A disaggregating power load system, comprising:
   a computer readable storage to store time series data representing total energy consumption;
   an analysis engine to identify distinguishing features in the time series data;
   a module to identify energy consumption constituents of the total energy consumption based on the features; and
   wherein ON-durations of an appliance are modeled using a gamma distribution, and a state of the appliance is dependent at least in part on a state of at least one other appliance.

9. The system of claim 8, further comprising:
   a model selected using the features;
   model parameters determined using historic data; and
   wherein the model and model parameters are used to identify the energy consumption constituents.

10. The system of claim 8, wherein the time series data is sampled at a low frequency.

11. The system of claim 8, wherein the analysis engine includes a module for identifying energy consumption constituents using a Factorial Hidden Semi-Markov Model (FHSMM).

12. The system of claim 8, wherein the analysis engine includes a module using a Conditional Factorial Hidden Markov Model (CFHMM).

13. The system of claim 8, wherein the analysis engine includes a module using a Conditional Factorial Hidden Semi-Markov Model (CFHSMM).

14. The system of claim 8, wherein stable state signatures are used for identifying features in the time series data.

15. The system of claim 14, wherein the stable state signatures include: power consumption, on/off duration distribution, on/off duration shape, and dependency between appliances.

16. The system of claim 14, wherein the stable state signatures include: time, temperature, sound, light, or vibration.

17. The system of claim 14, wherein the stable state signatures include: time and date patterns.

18. A disaggregating power load system, comprising:
   a processor and a memory;
   an analysis engine executed by the processor to analyze time series data representing total energy consumption;
   a model-based module executed by the processor to identify features in the time series data and identify energy consumption constituents of the total energy consumption based on the features; and
   wherein ON-durations of an appliance are modeled using a gamma distribution, and a state of the appliance is dependent at least in part on a state of at least one other appliance.

19. The system of claim 18, wherein the model-based module uses at least one of a Conditional Factorial Hidden Markov Model (CFHMM), a combination Factorial Hidden Semi-Markov Model (FHSMM) and Conditional Factorial Hidden Markov Model (CFHMM), and a Conditional Factorial Hidden Semi-Markov Model (CFHSMM).

20. The system of claim 18, wherein stable state signatures are used for identifying features in the time series data, the stable state signatures including at least one of power consumption, on/off duration distribution, on/off duration shape, and dependency between energy-consuming devices.

* * * * *